Figure 1:
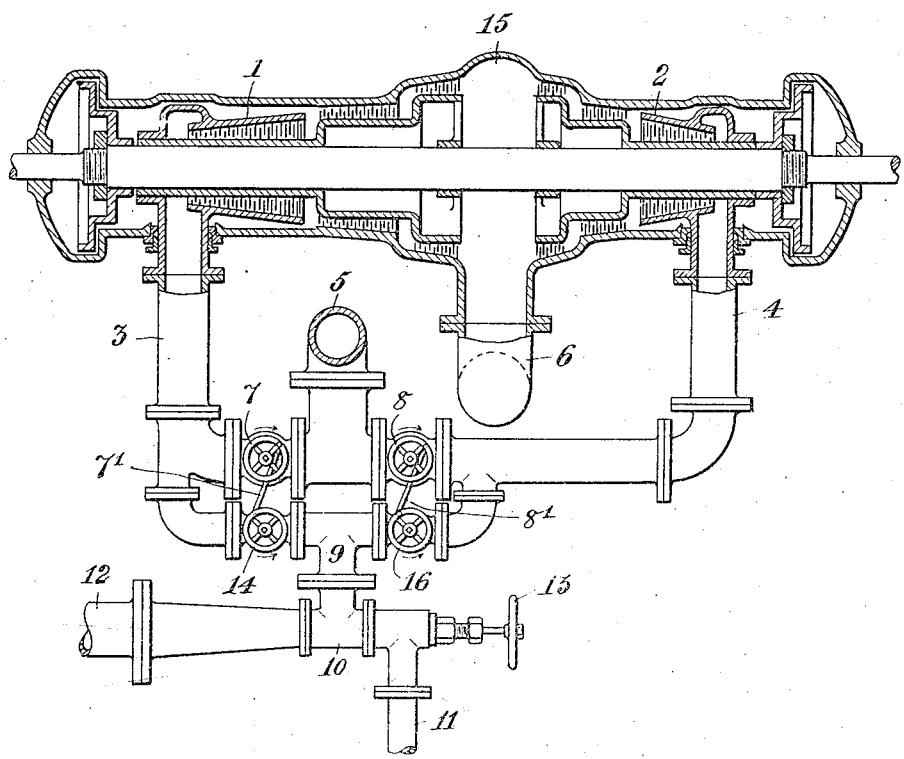

F. LJUNGSTRÖM.
COOLING IDLE RUNNING TURBINES.
APPLICATION FILED DEC. 5, 1918. RENEWED OCT. 13, 1920.

1,359,902.

Patented Nov. 23, 1920.
2 SHEETS—SHEET 1.

Inventor:
Fredrik Ljungström,
by *Albert G. Davis*
His Attorney.

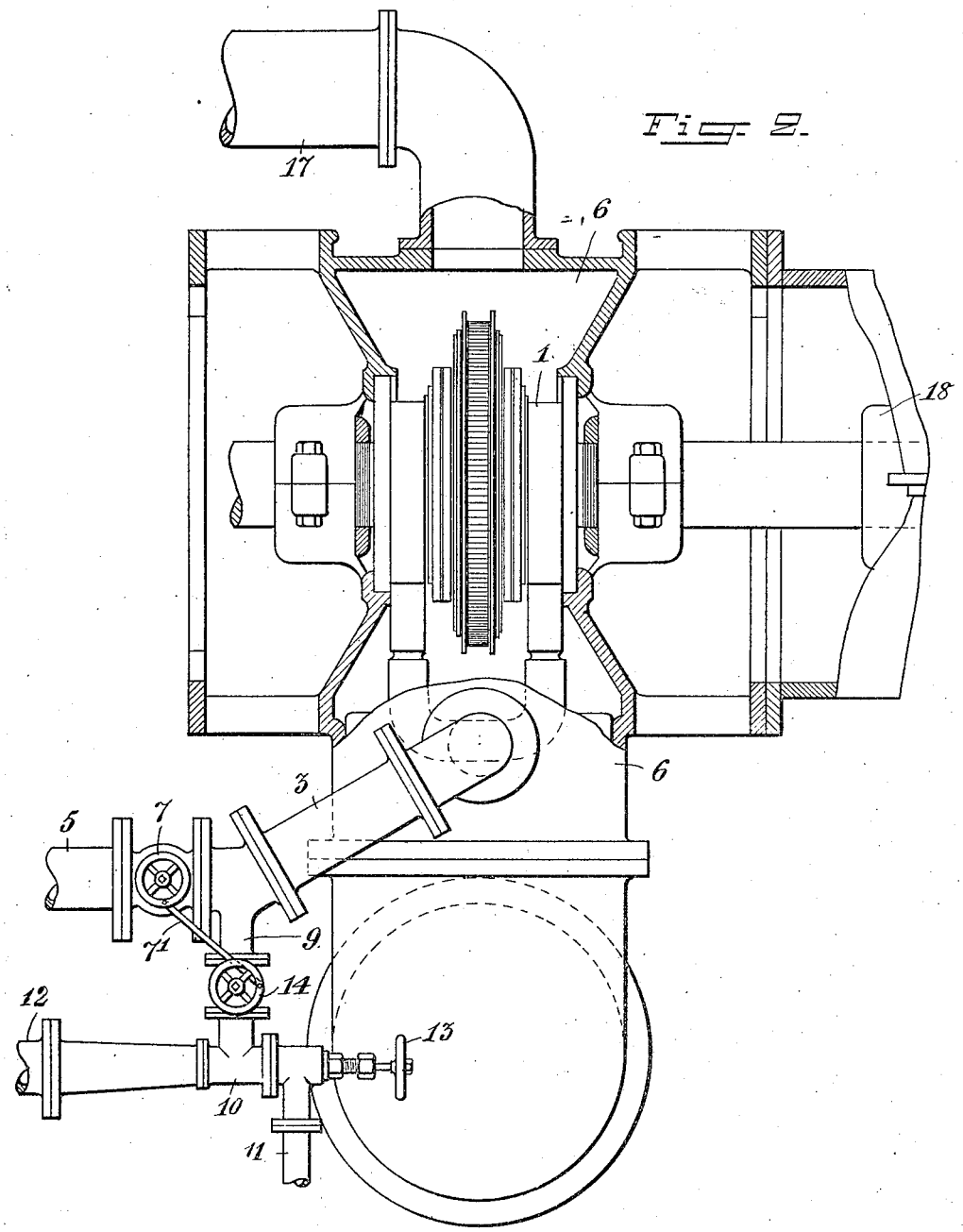

UNITED STATES PATENT OFFICE.

FREDRIK LJUNGSTRÖM, OF BREVIK, LIDIN SWEDEN, ASSIGNOR TO AKTIE-
BOLAGET LJUNGSTROMS ANGTURB. SKARSATRA, SWEDEN.

COOLING IDLE-RUNNING TURBINES.

1,359,902. Specification of Letters Patent. Patented Nov. 23, 1920.

Application filed December 5, 1918, Serial No. 265,449. Renewed October 13, 1920. Serial No. 416,775.

*To all whom it may concern:*

Be it known that I, FREDRIK LJUNG-STRÖM, a subject of the King of Sweden, residing at Brevik, Lidingön, Sweden, have invented certain new and useful Improvements in Cooling Idle-Running Turbines, of which the following is a specification.

Where, for some reason or other, elastic fluid turbines are so arranged that, on any occasion, one or more of them will be rotated without delivering any work, it has been found, that such idle-running turbines are heated by the friction of the remaining gas or steam against the blades, to temperatures which may be detrimental to the turbine.

The object of this invention is to avoid this inconvenience and prevent the occurence of temperatures whereby the turbine could be damaged.

The invention comprises an arrangement so devised that air, live steam or exhaust steam from a power delivering turbine will be sucked through an idle-running turbine in a direction opposite to the normal direction of flow of the steam, to cool the rotor thereof.

If the exhaust steam above mentioned is not wet or saturated, any other wet steam, for instance tapping-steam, or, if wanted, live steam may be used for the cooling, said steam being then supplied through the exhaust of the idle-running turbine.

For sucking the steam through the idle running turbine preferably an ejector is used which is so connected to the corresponding inlet-valve, that, as soon as the inlet-valve of any turbine is closed, the ejector begins sucking the steam through this turbine. However, any other apparatus may be used for the same purpose.

In the accompanying drawing Figures 1 and 2 show two embodiments of the invention in a longitudinal section, Fig. 1 showing two turbines coupled together in such a manner that one of them acts as a reversing turbine relatively to the other, while Fig. 2 shows a turbine supposed to be coupled to its driving shaft in such a manner that, under certain circumstances, it will be rotated in its own direction of movement without delivering any work.

In Fig. 1, 1 indicates a larger turbine, adapted for forward running, and 2 a reversing turbine which is somewhat smaller than the turbine 1. 3 and 4 are the steam supply conduits of the corresponding turbines 1 and 2 which conduits are coupled to the main supply conduit 5 by means of the inlet-valves 7 and 8 respectively. 6 is the common exhaust pipe. The valves 7 and 8 are so constructed and connected to the valves 14 and 16 respectively that, when the first is closed and thus the connection between conduits 3 and 5 or conduits 4 and 5 is closed, the valve 14 or 16 respectively will be opened, so that connection is automatically established between the conduit 3 and the T-tube 9 or the conduit 4 and the T-tube 9. This T-tube 9 is connected with an ejector 10 provided with water-supply conduit 11 and the discharge pipe 12. 13 is the hand wheel of a valve for regulating the water-supply.

If the turbine system for instance rotates in the working direction of the turbine 1, the valves 7 and 8 are adjusted so as to provide communication between the conduits 5 and 3 on one side and the conduit 4 and tube 9 on the other side. In this case the turbine 2 rotates backward, the exhaust steam from the turbine 1 being then sucked by the ejector 10 from the space 15 through the turbine 2, conduit 4, the valve 16 and the tube 9, and discharged through pipe 12.

Fig. 2, 1 is a turbine which, on certain occasions, may be rotated by means of a gearing or another machine 18 and, therefore, is to be cooled. The inlet valve 7 is arranged in the supply pipe 3 and is combined with the valve 14 in such a way that, when inlet valve 7 is closed, valve 14 is automatically opened to establish communication between turbine 1 and ejector 10. The ejector 10 then immediately begins sucking steam through the turbine in the same manner as in Fig. 1, which steam is supplied through the steam-pipe 17. This steam may either be tapping steam or exhaust steam from another turbine or wet or saturated live steam.

The remaining reference numerals in Fig. 2 indicate the same parts as Fig. 1.

Preferably, in all embodiments of the invention, the ejector 10 is connected with valve 14 or valve 16, or with valve 7 or valve 8 in such manner that the ejector will be put into action whenever either valve 14 or valve 16 is opened, or valve 7 or valve 8 respectively is closed.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

Claims.

1. In a machine installation, the combination with a turbine which may be rotated without delivering work, of means for sucking a cooling medium through said turbine in a direction opposite to the normal direction of flow, for cooling the turbine.

2. In a machine installation, the combination with a turbine which may be rotated without delivering work, of an ejector adapted to be connected to the admission side of the turbine for sucking a cooling medium through said turbine in a direction opposite to the normal direction of flow for cooling the turbine, and means for supplying operating fluid to said ejector.

3. The combination with an ahead turbine and a reversing turbine connected to the same shaft, of means for sucking a cooling medium through either of said turbines in a direction opposite to the normal direction of flow for cooling such turbine when it is running idle and being driven by the other turbine.

4. The combination with an ahead turbine, and a reversing turbine connected to the same shaft, of means for sucking cooling medium backward through either of said turbines when it is running idle.

5. The combination of a turbine structure comprising an ahead section and a reversing section mounted in the same casing and having a common exhaust conduit, of means connected to the admission ends of each of said turbine sections for sucking a cooling medium backward through such section when such section is running idle.

6. The combination with a turbine structure comprising an ahead turbine, and a reversing turbine located in a common casing, and having a common exhaust conduit, of an ejector adapted to be connected to the admission end of either of said turbine sections for sucking a cooling medium through such turbine section, and means for supplying operating fluid to said ejector.

7. In a machine installation, the combination of a turbine which may be rotated without delivering work, an inlet conduit connected to the admission end of said turbine, a supply conduit, an ejector, and valve means for connecting either said supply conduit or said ejector to said inlet conduit.

8. In a machine installation, the combination of a turbine which may be rotated without delivering work, an inlet conduit connected to the admission end of said turbine, a supply conduit connected to said inlet conduit, a valve in said supply conduit, an ejector, a pipe connecting the ejector to said inlet conduit, a valve in said pipe, and means connecting said valves to each other whereby when one of said valves is opened the other is automatically closed.

9. An elastic fluid turbine comprising an ahead section, a reversing section, an inlet conduit for the ahead section, an inlet conduit for the reversing section, a supply conduit, an ejector, and valve means whereby said supply conduit and ejector may be connected alternately to either of said inlet conduits.

In testimony whereof I affix my signature in presence of two witnesses.

FREDRIK LJUNGSTRÖM.

Witnesses:
 JACOB BAGGE,
 AXEL HAMBERG.